(12) United States Patent
Delery et al.

(10) Patent No.: US 7,097,305 B2
(45) Date of Patent: Aug. 29, 2006

(54) METHOD OF PRODUCING A CORRECTIVE SPECTACLE LENS AND LENS BLANK USED FOR SAME

(75) Inventors: Marc Delery, Caluire et Cuire (FR); Patrick Thomas, Moirans en Montagne (FR)

(73) Assignees: Thomas SA, Moirans en Montagne (FR); Marc Delery, Caluire et Cuire (FR)

( * ) Notice: Subject to any disclaimer, the term of this patent is extended or adjusted under 35 U.S.C. 154(b) by 0 days.

(21) Appl. No.: 11/127,503

(22) Filed: May 12, 2005

(65) Prior Publication Data

US 2005/0213032 A1    Sep. 29, 2005

Related U.S. Application Data

(63) Continuation of application No. PCT/FR03/003408, filed on Nov. 18, 2003.

(30) Foreign Application Priority Data

Nov. 18, 2002   (FR) .................................. 02 14370

(51) Int. Cl.
   *G02C 7/02*      (2006.01)
(52) U.S. Cl. ..................... 351/177; 351/159; 451/42
(58) Field of Classification Search ............... 351/177, 351/174, 168, 57–58
   See application file for complete search history.

(56) References Cited

U.S. PATENT DOCUMENTS

| 1,932,100 | A | * | 10/1933 | Culver et al. ............... 351/167 |
| 2,029,480 | A | * | 2/1936 | Hammon ..................... 351/170 |
| 3,750,272 | A |   | 8/1973 | Gomond |
| 4,558,931 | A |   | 12/1985 | Fuhrman |
| 4,701,288 | A |   | 10/1987 | Cook et al. |
| 4,856,234 | A | * | 8/1989 | Goins .......................... 451/42 |
| 6,309,067 | B1 | * | 10/2001 | Zeidler ....................... 351/159 |
| 6,709,104 | B1 | * | 3/2004 | Alberts ........................ 351/168 |
| 2003/0022610 | A1 | * | 1/2003 | Simke et al. ................ 451/384 |

FOREIGN PATENT DOCUMENTS

EP   0 371 621 A1   6/1990
FR   2 076 643 A1   10/1971

\* cited by examiner

*Primary Examiner*—Jordan M. Schwartz
(74) *Attorney, Agent, or Firm*—Burr & Brown

(57) ABSTRACT

A method for manufacturing a correctable lens for glasses from an injectable thermo-plastic polymer material, or other moldable polymer, includes the step of molding a polymer blank provided with the contour of the corrective lens. The polymer blank is joined with a peripheral piece having the same internal radius of curvature as that of the polymer blank creating a lens blank. The internal face of the lens blank is ground and polished to obtain the desired ocular correction. The polymer blank is then separated from the lens blank, the lens blank now being the corrective lens ready for assembly with the frame.

12 Claims, 3 Drawing Sheets

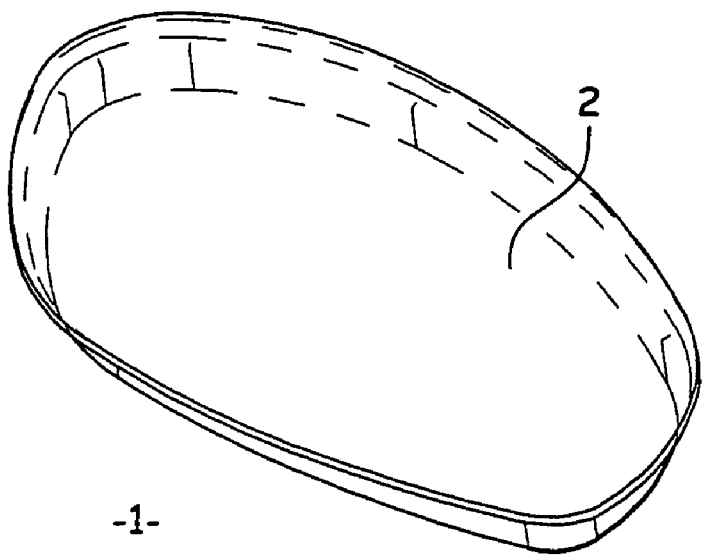
Fig. 1
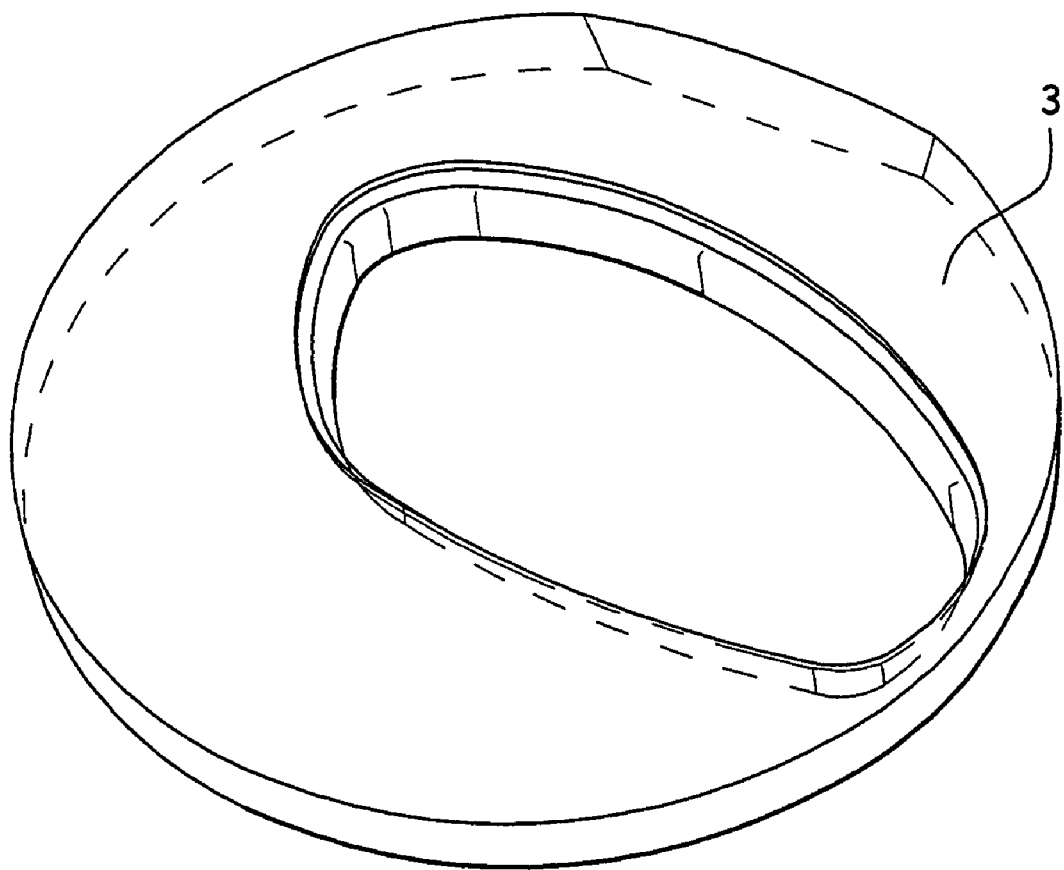

METHOD OF PRODUCING A CORRECTIVE SPECTACLE LENS AND LENS BLANK USED FOR SAME

FIELD OF THE INVENTION

The invention relates to the field of glasses industry, and more particularly to the manufacture of corrective lenses. It aims more specifically at a method for manufacturing corrective lenses for glasses as well as a polymer blank used in such a method and intended to facilitate the different manufacturing steps.

The invention is more particularly suitable for the manufacture of corrective lenses to be placed in strongly curved glasses frames.

BACKGROUND OF THE INVENTION

Most corrective lenses for glasses are nowadays made from injectable thermo-plastic or polymerizable, resin-based materials, and are obtained from molded or injected lens blanks. This lens blank presents an exterior face, which is generally spherical or progressive, for which the radius of curvature is determined by the curvature of the frame. At this time, one can observe a marked tendency to favor strongly curved glasses with a large dihedral, wrapping around the curvature of the face.

The correction of each lens is obtained by machining the inner face of the lens blank, depending on the characteristics of the vision to be corrected.

A problem arises with strongly curved glasses having a large dihedral, since, particularly for myopic corrections, the peripheral thickness of the lens is thicker than its thickness at the optical axis level. This extra thickness must be set out in the area where the lenses clip into the frames. It is therefore possible to create a form adapted around the periphery of the lens, in order to snap it into a complementary groove made in the frame. One understands that when the extra, peripheral thickness of the lens is very large, the rim of the lens is visible from a distance, which may look unaesthetic.

Furthermore, those who wear corrective glasses, especially sunglasses, generally appreciate that one shall not be able to distinguish sunglasses with corrective lenses from sunglasses with non-corrective lenses.

It has also been suggested to reduce the extra, peripheral thickness of a corrective lens by making a tier of uniform thickness, which is then clipped into the frame groove. Realizing tiers of this nature is relatively complex and most frequently requires manual grinding or machining operations, which are incompatible with mass production and usually do not comply with quality criteria, particularly as concerns the repeatability of these operations.

Document FR 2 835 931 discloses a method consisting in machining corrective lenses using a particular lens blank having a molded recess in the central portion of its inner face, so as to define the future corrective lens. After creating this lens blank, it is necessary to proceed with a machining operation, which ensures the desired correction. Polishing operations then follow this machining operation. More precisely, the polishing is accomplished with a rotating tool, which the face located in contact with the surface to be polished is of a nearly analogous radius of curvature, and is equipped with an appropriate abrasive coating. One then proceeds to cut through the thin zone separating the future lens from the rest of the lens blank, particularly constituting its peripheral crown.

Considering that the future lens forms an extended edge on the inner face of the lens blank, one observes slope breaks forming relatively protruding ridges. These ridges might lead to problems during machining then polishing operations, which may notably damage the polishing tools as well as the lens.

Indeed, one can observe a degrading of the abrasive polishing coating due to damages caused by the ridges of the relief contour of the future corrective lens.

One problem, which the invention attempts to solve, is that of keeping the advantages procured by the fact that the contour of the corrective lens be made at the same time as the lens blank, but remaining all the while compatible with the use of classical polishing tools.

SUMMARY OF THE INVENTION

The invention hence relates to a method for manufacturing a corrective lens for glasses made of a thermo-plastic, injectable polymer material or another moldable polymer.

According to the invention, this method includes the following steps, which includes:
 providing by molding and/or machining a polymer blank with the contour of the corrected corrective lens;
 assembling the polymer blank with a peripheral part having the same inner radius of curvature as that of the polymer blank, so as to form a lens blank;
 machining and polishing the inner face of the lens blank so as to obtain the desired corrective vision;
 separating the polymer blank from the lens blank in order to obtain the corrective lens.

In other words, the invention first comprises making the future lens, with the final contour required for its arrangement in the glasses frame, and thereby incorporating the possible tiers or other designs cooperating with the frame. This polymer blank, or pre-lens, is then assembled with a peripheral part, which surrounds the polymer blank, and which prolongs the inner surface of the future corrective lens in order to form a surface which is continuously curved across the junction of the future lens and the additional peripheral part.

Machining the inner face of the lens blank is thus realized at the same time on the inner face of the future lens, and also partially on the additional peripheral piece. One thus keeps this continuity of curvature, which enables the use of traditional polishing tools without impairing their abrasive coating, since neither slope nor ridge break is made prior to polishing. This continuity limits or at least reduces the formation of dribbles. It then suffices for the operator to separate the correctly machined corrective lens from the peripheral piece, which may then be eliminated or even recycled.

Advantageously, the polymer blank and the peripheral piece are also both provided with the same outer radius of curvature, thus give conveying to the lens blank used for machining a continuously curved outer surface.

In practice, the polymer blank may be obtained by molding followed by machining to create the optical correction.

In practice, the polymer blank and the peripheral piece may advantageously be assembled by mechanical fitting, or even by gluing.

One may also foresee that the peripheral piece be obtained by over-molding on the polymer blank while keeping at the interface level between the two elements a coating to aid in their final separation.

In practice, the intermediate composite lens blank may be subjected to a certain number of treatments, particularly on its outer face, but also on its inner face, after machining the inner face. These treatments may also be realized on the polymer blank alone, temporarily separated from the peripheral piece. These different treatments permit, for example, depositing a varnish or a metallic or an anti-reflection layer on the lens, or even proceeding through color adjustments of the lens.

Thus, the intermediary lens blank, comprises two assembled parts, which are:

a polymer blank having the contour of the corrective lens, made of a thermoplastic, injectable material, or of a moldable, polymerizable resin;

a peripheral piece, surrounding the polymer blank, having the same inner radius of curvature as that of the polymer blank, at least at the point of junction between the peripheral piece and the polymer blank.

In practice, the polymer blank and the peripheral part are made of identical materials, specifically in order to avoid the transfer of matter from the peripheral piece to the future corrective lens when the lens blank is subjected to machining and polishing operations. The use of an identical material will also ensure uniform shrinking effects as the two parts of the lens blank cool, or dilation effects during finishing operations.

BRIEF DESCRIPTION OF THE DRAWINGS

The manner of carrying out the invention as well as the resulting advantages will be apparent in the following description of a mode for carrying out the invention which follows and is supported by additional figures in which:

FIG. 1 is a perspective view of a lens blank realized according to the invention from a polymer blank and a peripheral piece.

DETAILED DESCRIPTION OF THE INVENTION

Figure 2:
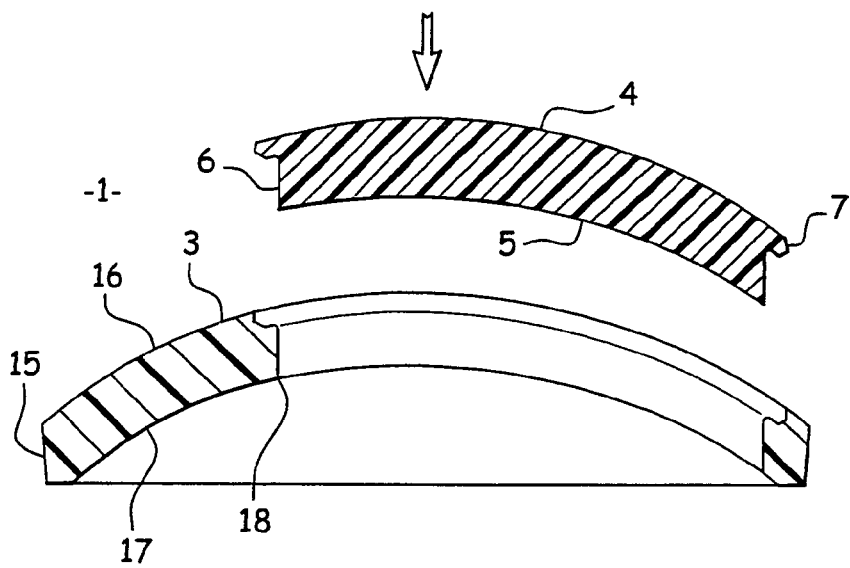
FIG. 2 is a cross-sectional view of the lens blank of FIG. 1, shown before assembling the two constitutive parts.

As previously indicated, the invention permits the manufacture of corrective lenses, particularly lenses to be placed in strongly curved glasses. The lenses arranged in this type of glasses are of highly stressed sphericity, corresponding to the radius of curvature of the outer surface. In the field of glasses industry, the sphericity is usually defined by a base number. Thus, for example, one speaks of an 8-base lens for lenses which radius of curvature of the outer face is between 65 mm to 69 mm.

This type of lens may be made using the lens blank (1) shown in FIG. 1. Such a lens blank (1) is composed by assembling a polymer blank (2) and a peripheral piece (3) into which the polymer blank is fitted.

More precisely, the polymer blank (2) is obtained by molding or machining operation, thus defining an outer spherical face (4) as well as an inner face (5), mostly also spherical, before being machined to the desired corrective vision.

This molding and/or machining operation also defines the contour (6) of the future lens, which is specific to every frame. Thus, each frame type requires its particular polymer blank mold to produce polymer blanks of the desired contour. One conceives that the method is not limited to a particular frame form, but on the contrary, encompasses all the most varied possible geometries.

Figure 6:
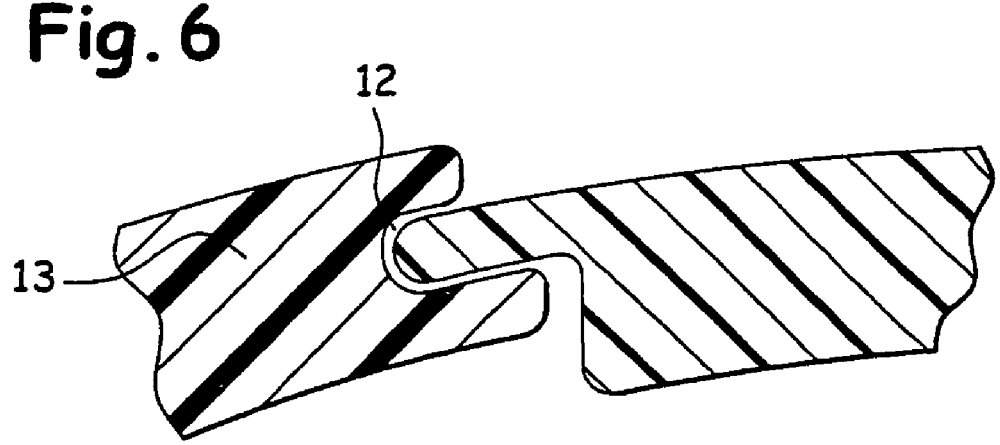
FIG. 6 is a cross-sectional view of the detail of a corrective lens made according to the invention and arranged in a glasses frame.

As illustrated in FIG. 2, the polymer blank (2) is also provided with a peripheral tier (7) forming a zone of reduced thickness, that is to be clipped, as illustrated in FIG. 6, into the groove (12) of a frame (13). Of course, the invention is not limited to the shape of tier illustrated in FIG. 2, but on the contrary, covers all geometries permitting a relation with a frame for glasses.

The polymer blank (2) may be obtained by injection/molding of different types of thermo-plastic polymer materials among which are cited the general family of polycarbonates, as well as the polyamides, and particularly the polyamide sold under reference TR90 by the EMS Company. These thermo-plastic materials may either be colorless or be tinted throughout, so as to obtain lenses for polarized or photochromic solar protection.

For sunglasses lenses, lens coloring may be realized either during injection, or by using a specific treatment, which will be described later on.

Independently of the manufacturing of the polymer blank (2), the peripheral piece (3) is made, for example, by molding. This peripheral piece is generally circular in shape, which enables it to be used in machines which handle the lens blank by its peripheral crown (15). Nevertheless, particular non-circular forms may also be used, especially when it is desired to locate in space the orientation of the lens blank or of the peripheral piece. One can, for example, obtain a generally circular shape provided with two flattened edges. This peripheral piece is also presenting an outer face of the same radius of curvature as that of the outer face (4) of the polymer blank.

The inner face (17) of the peripheral piece (3) may also be spherical in shape, and present the same radius of curvature as that of the inner face (5) of the polymer blank (2). More precisely, it is preferable that these radii of curvature be identical at least near the junction zone (18) between the peripheral piece (3) and the polymer blank (2). The radius of curvature of the peripheral piece may slightly change in the vicinity of the rim of the peripheral piece (3) without stepping out of the scope of invention.

This peripheral piece (3) may advantageously be manufactured using a material identical to that of the polymer blank (2), which avoids the differences in shrinking as the material cools, as well as possible migrations which could intervene at the junction between both elements (2, 3).

In the form illustrated, the peripheral piece (3) is obtained by independent molding, which then permits its mechanical assembly with the polymer blank (2). Nonetheless, as earlier mentioned, this peripheral piece (3) may be molded over the polymer blank (2). In this case, one will use different materials for the polymer blank (2) and for the peripheral piece (3), so as to avoid fusing them in their contact zone. One may also foresee using identical materials for the over-molding, but with the inclusion of an interfacial surface coating to facilitate the final separation of the peripheral piece (3) and the polymer blank (2).

Figure 3:
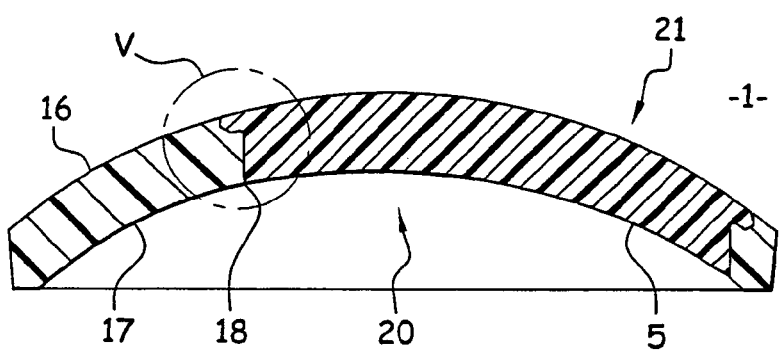
FIG. 3 is a cross-sectional view analogous to FIG. 2 in which the lens blank is assembled.

Therefore, after assembling the peripheral piece (3) and the polymer blank (2), the lens blank (1) illustrated in FIG. 3 is obtained, on which it may be observed that the inner face presents a continuous curvature at the junction zone (18).

Figure 5:
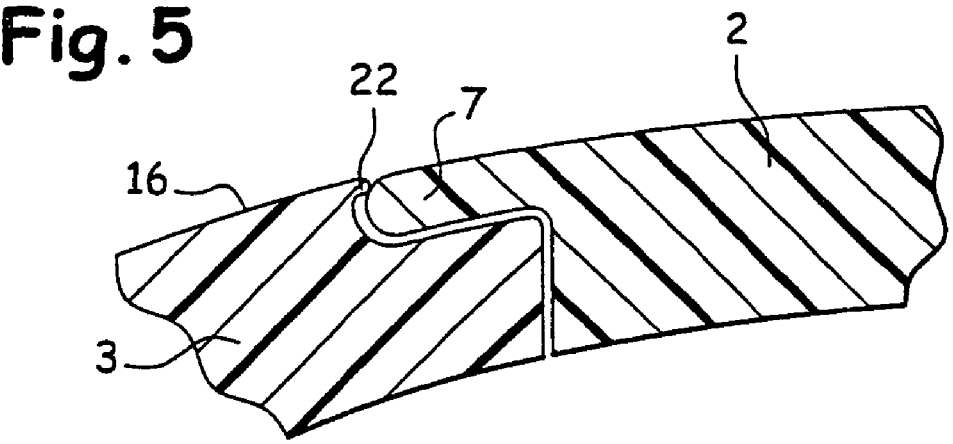
FIG. 5 is a detailed cross-sectional view of FIG. 3.

As illustrated in FIG. 5, the outer face (21) of the lens blank (1) may have a ridge (22) bordering a groove aimed at holding the polymer blank (2) in the peripheral piece (3). This is particularly useful in the case of machined lenses nearing the thickness of the lens deprived of any corrective effect, when most of the extra thickness of the peripheral piece (3) is machined.

Figure 4:
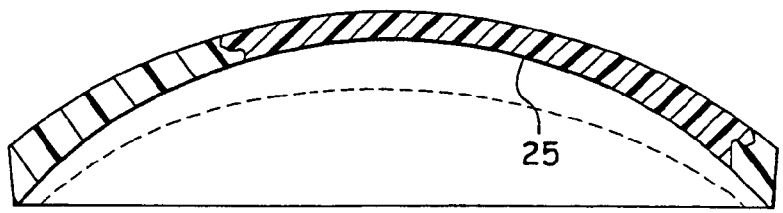
FIG. 4 is a cross-sectional view analogous to FIG. 3, shown after machining and polishing operations.

After assembling the peripheral piece (3) with the polymer blank (2), a lens blank (1) is obtained, which is easily handled by common grinding or machining devices, and especially the machining centers of the Schneider Company. The lens blank (1) can then be machined on its inner face (20) to obtain the desired correction. This machining thusly defines the curvature specific to the inner face (25) of the future lens, as illustrated in FIG. 4.

This curvature may be different from one axis to another depending on the type of correction desired. The optical axis may also be variably positioned, depending upon the interpupillary space and the form of the frame. The machining operation is followed by a polishing operation, which gives the inner face (25) of the lens an appropriate surface state.

One of the advantages of the invention is to enable the polishing of a fraction of the inner surface of the lens blank (1) which extends beyond the inner surface (5) of the lens, thereby resulting in a uniform polished quality over the entire surface of the lens. Another advantage is the reduction if not total suppression of machining dribbles.

As already said, the lens blank (1) or the polymer blank (2) can then be subjected to different types of treatment, such as coloring, flashing or other. The fact that the polymer blank (2) be held in the peripheral piece (3) facilitates handling during certain of these treatment steps. One may indicate, for example, that in flashing, the irregularities observed at perimeter points of the lens blank (1) are located on the peripheral piece (3), which is to be eliminated, and therefore have no incidence on the treatment of the lens.

Other different treatments specific to particular applications may also be realized on the lens blank (1) or on the polymer blank (2) alone.

For other treatment operations or washing, it is possible to mechanically separate the polymer blank (2) from the peripheral piece (3).

Then, it therefore suffices to mechanically separate the polymer blank (2) from the peripheral piece (3), by a simple gesture requiring no special tool. A ready-to-use lens is then obtained, which is immediately incorporable into a frame. Separation of the peripheral piece and the lens may take place either immediately before mounting, or directly at the end of treatments, so as to provide the glasses assembler with a pair of ready-to-use lenses.

It stands from what has preceded, that the invention enables manufacturing corrective lenses in a particularly easy manner, and adaptable to frames of the most diverse shapes, and by facilitating the sequence of different steps of molding, machining, and of specific treatments to get a desired optical quality and a simple mounting without any machining or touch ups for adjustment of any sort.

The invention claimed is:

1. A method for manufacturing a corrective lens for glasses made of a thermo-plastic, injectable polymer material, or other moldable polymer comprising:
   providing a polymer blank having the contour of said corrective lens;
   assembling said polymer blank with a peripheral piece having the same inner radius of curvature as that of said polymer blank, so as to form a lens blank having an inner face lying along a single radius of curvature;
   machining and polishing said inner face of said lens blank to obtain a desired ocular correction; and
   separating said polymer blank from said lens blank in order to obtain said corrective lens ready to be assembled in a frame.

2. A method according to claim 1, wherein said peripheral piece and said polymer blank have identical outer radii of curvature.

3. A method according to claim 1, wherein said polymer blank is obtained by molding.

4. A method according to claim 1, wherein the contour of said polymer blank is obtained by machining.

5. A method according to claim 1, wherein said polymer blank and said peripheral piece are assembled by mechanical fitting.

6. A method according to claim 1, wherein said peripheral piece is over-molded on said polymer blank.

7. A method according to claim 1, wherein said lens blank is subjected to treatments on its outer face, after machining of its inner face.

8. A lens blank intended to be used for the manufacture of a corrective lens for glasses, comprising:
   a polymer blank, provided with the contour of said corrective lens, and made from one of a thermoplastic injectable material and another moldable polymer; and
   a peripheral piece, releasably surrounding said polymer blank, and provided with the same inner radius of curvature as that of said polymer blank,
   wherein during machining and polishing of said lens blank an inner face of said polymer blank and an inner face of said peripheral piece extend along a single radius of curvature and wherein of said lens blank only the polymer blank is assembled in a frame.

9. A lens blank according to claim 8, wherein said polymer blank and said peripheral piece are made of identical materials.

10. A lens blank according to claim 8, wherein said peripheral piece and said polymer blank have identical outer radii of curvature.

11. A lens blank according to claim 8, wherein said polymer blank further comprises a tier located along a periphery of said polymer blank.

12. A method according to claim 5, wherein said mechanical fitting includes at least one of wedging, clipping and gluing.

* * * * *